Figures 1, 2, 3, 4:
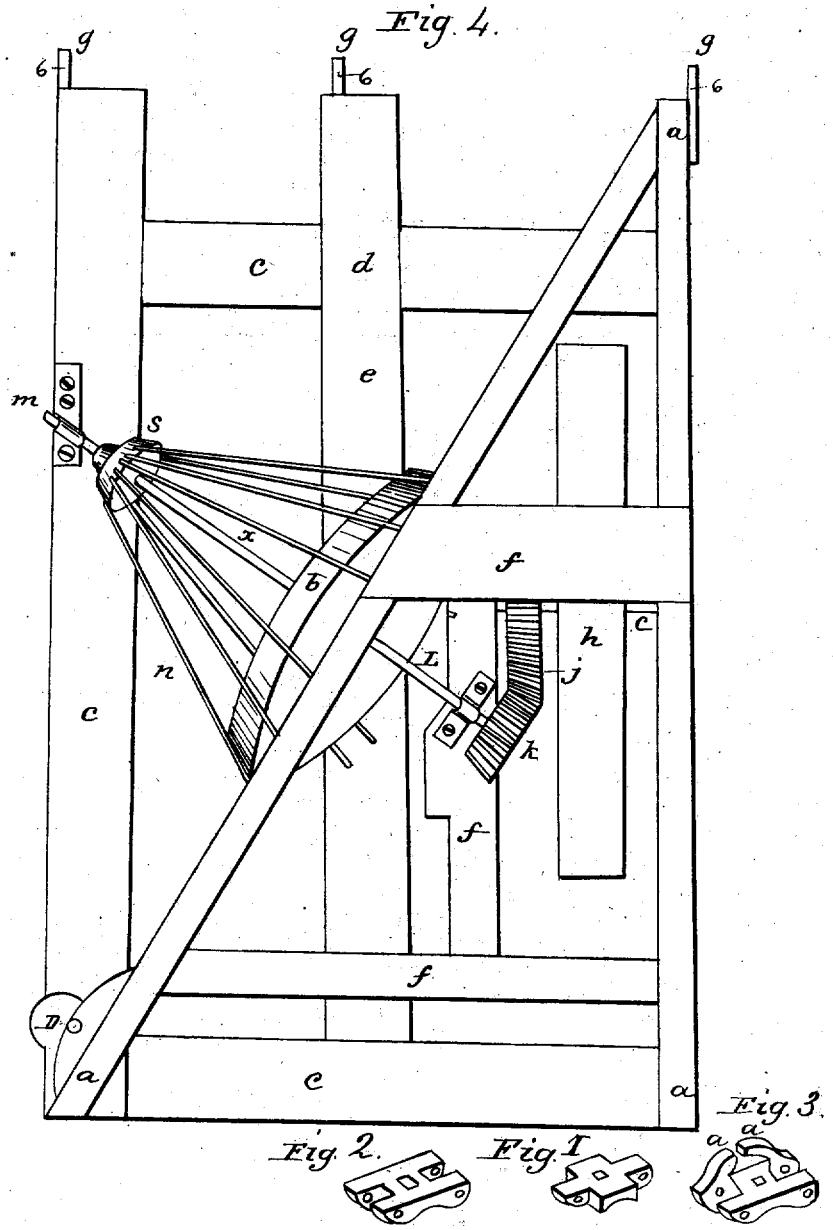

6 Sheets—Sheet 1.
J. L. HARDEMAN.
Flax Harvester.
No. 1,201. Reissued June 18, 1861.
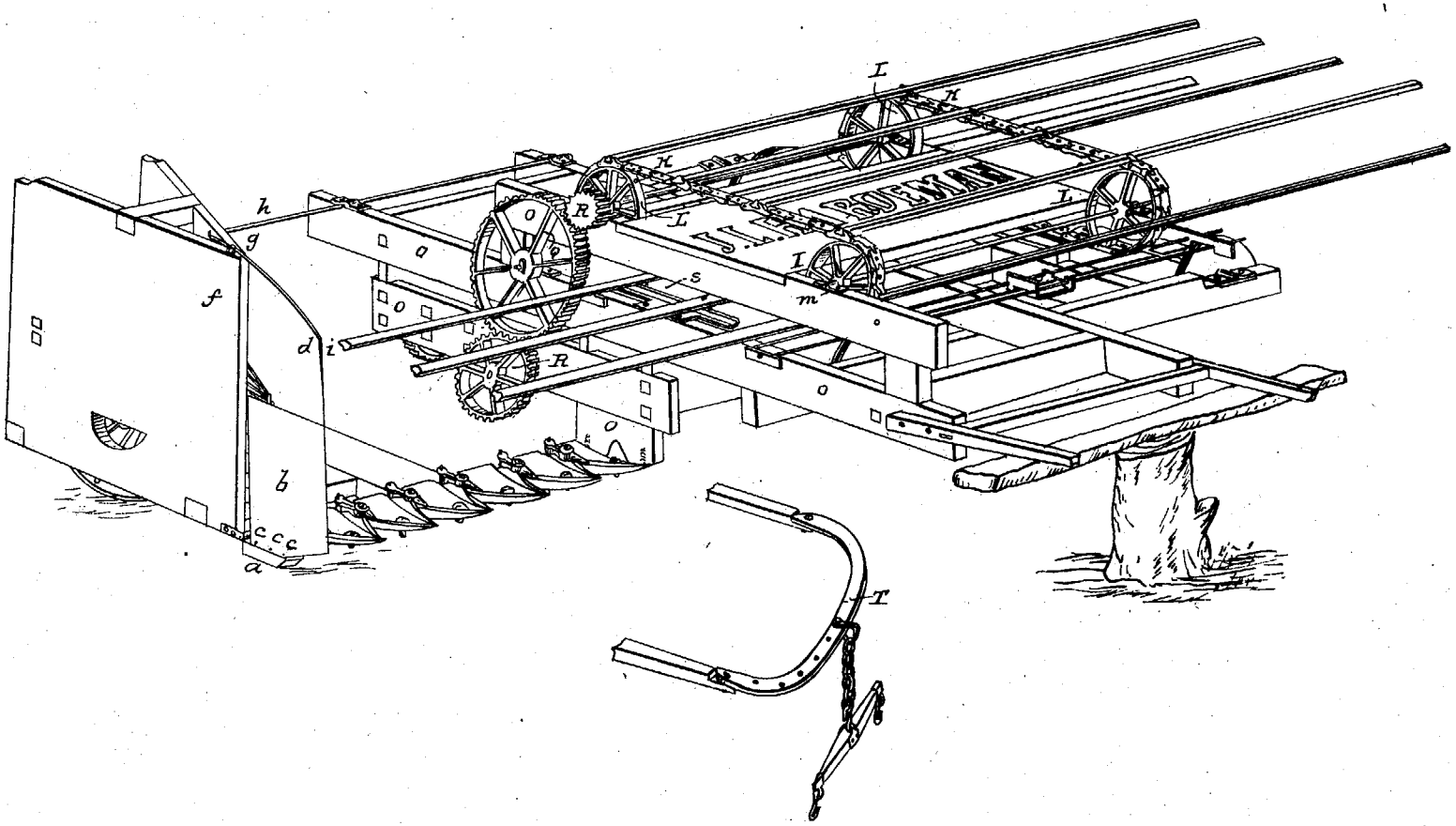
N. PETERS, Photo-Lithographer, Washington, D. C.

6 Sheets—Sheet 2.
J. L. HARDEMAN.
Flax Harvester.
No. 1,201.
Reissued June 18, 1861.
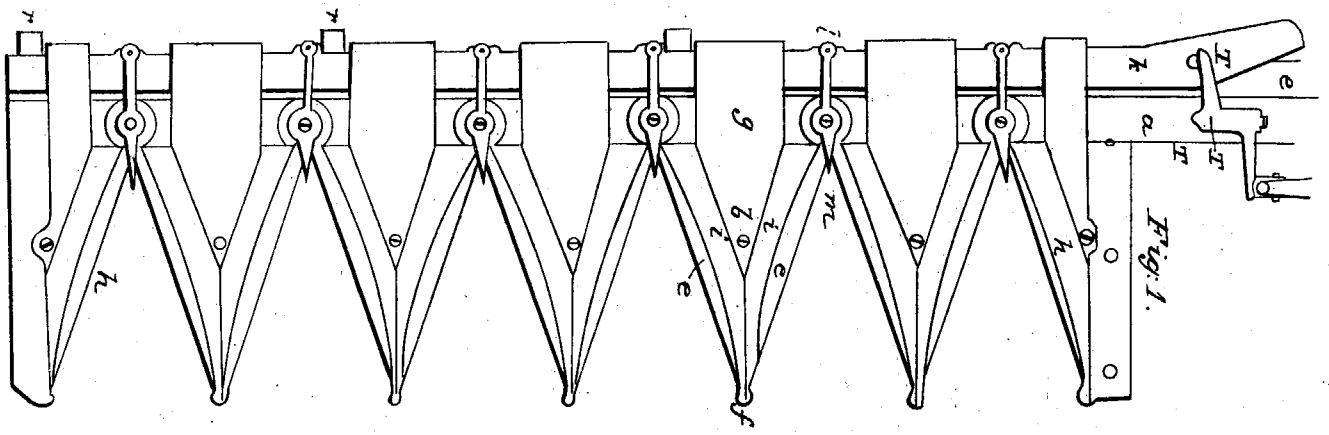
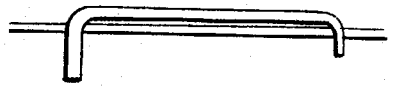
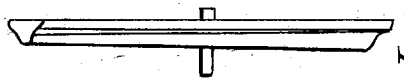
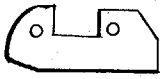
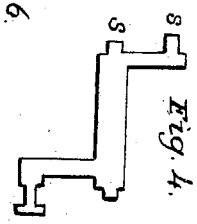
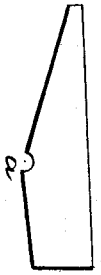
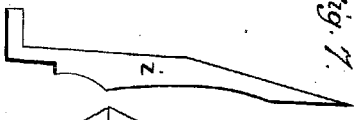
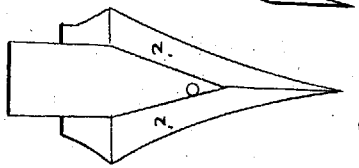
N. PETERS, Photo-Lithographer, Washington, D. C.

J. L. HARDEMAN.

6 Sheets—Sheet 3.

Flax Harvester.

No. 1,201.

Reissued June 18, 1861.

N. PETERS, Photo-Lithographer, Washington, D. C.

6 Sheets—Sheet 4.
J. L. HARDEMAN.
Flax Harvester.
No. 1,201.
Reissued June 18, 1861.
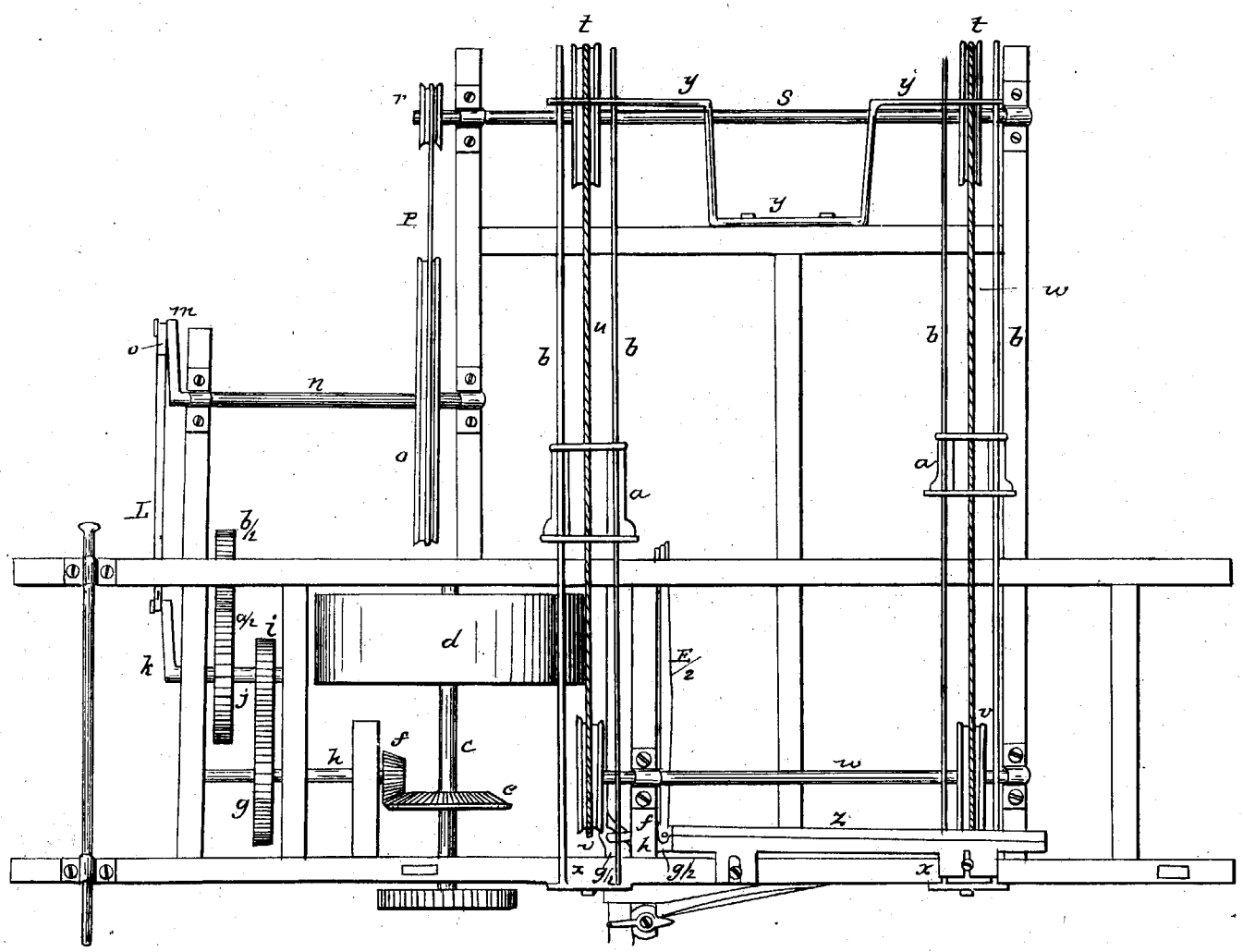
N. PETERS, Photo-Lithographer, Washington, D. C.

6 Sheets—Sheet 5.
J. L. HARDEMAN.
Flax Harvester.
No. 1,201.
Reissued June 18, 1861.
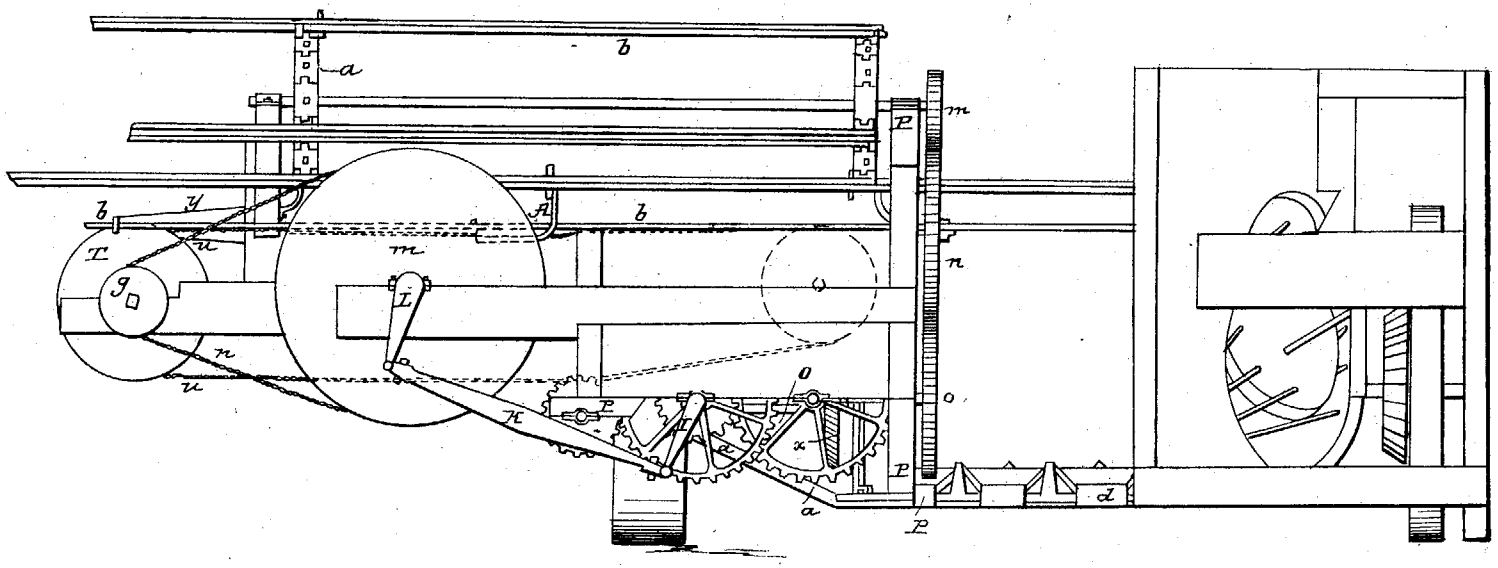
N. PETERS. Photo-Lithographer, Washington, D. C.

6 Sheets—Sheet 6.
J. L. HARDEMAN.
Flax Harvester.
No. 1,201.
Reissued June 18, 1861.
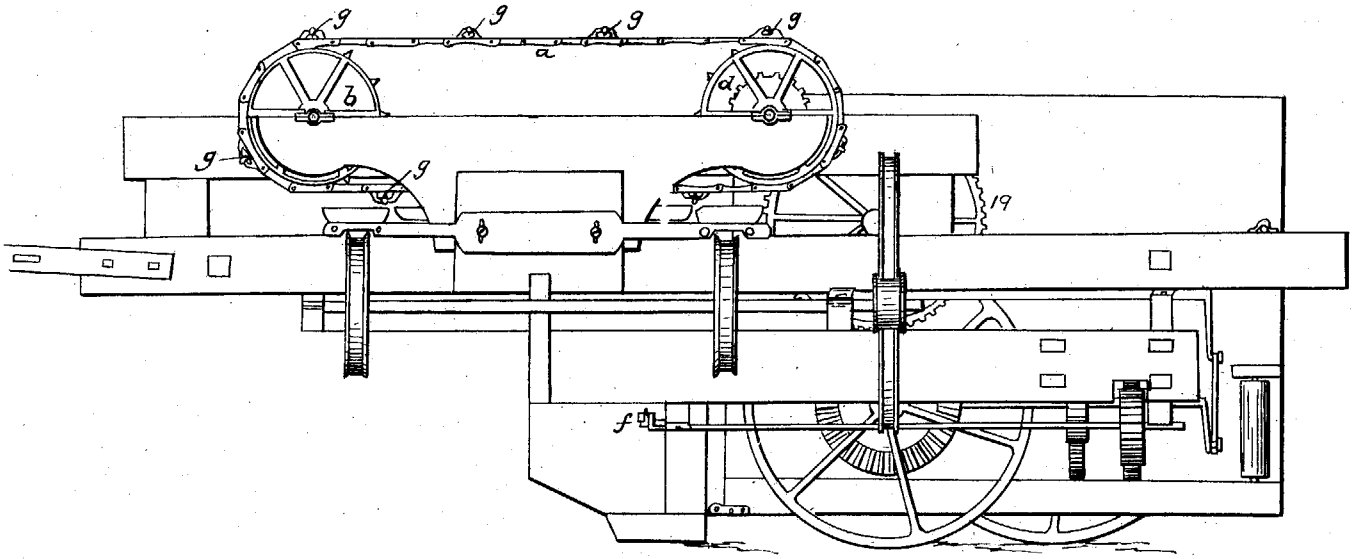
N. PETERS, Photo-Lithographer, Washington, D. C.

UNITED STATES PATENT OFFICE.

WM. N. WHITELEY, OF SPRINGFIELD, OHIO, ASSIGNEE, BY MESNE ASSIGNMENTS, OF JOHN LOCKE HARDEMAN, DECEASED.

IMPROVEMENT IN MACHINES FOR CUTTING HEMP.

Specification forming part of Letters Patent No. 7,578, dated August 20, 1850; Reissue No. 1,201, dated June 18, 1861.

DIVISION B.

*To all whom it may concern:*

Be it known that JOHN LOCKE HARDEMAN, of Saline county, near Arrow Rock, and State of Missouri, invented a new and Improved Mode of Removing Hemp, Millet, and other Grain from the Cutting Apparatus of Harvesting-Machines, of which the following is a full, clear, and exact description, reference being had to the accompanying drawings, forming a part of this specification by plates, figures, and letters.

The separator consists of a sheet-iron plate, *b*, Plate 1, one foot four inches wide, two feet high, and securely fastened by rivets *c c c*, Plate 1, to the right-hand end of the arm, having a strong wire or rod, *d*, Plate 1, three-eighths of an inch in diameter, in the front edge, rising two feet and extending upward and back to the wedge *f*, Plate 1, to which it is attached by a small loop, *g*, Plate 1, through which it passes.

The conveyer consists of a wedge, *a a a*, Plate 3, Figure 4, and a cone, *b*, Plate 3, Fig. 4, both resting on a frame-work, *c c c c*, Plate 3, Fig. 4, which is made of four pieces of timber three by six inches, two of them four feet long, and the others two feet six inches long, joined by mortises and tenons, except at *a*, where they are halved together. The wedge *a a a*, Plate 3, Fig. 4, is framed of plank three feet high, with cross-timbers *f f f*, Plate 3, Fig. 4, to strengthen it, and form supports for the shafts, with an opening in the left-hand side for the cone *b*, Plate 3, Fig. 4, the whole being attached by a set of simple hinges, *g g g*, Plate 3, Fig. 4. To the back of the arm *d*, Plate 2, Fig. 1, at the points *r r r*, Plate 2, Fig. 1, within the wedge, is a cast-iron wheel, *h*, Plate 3, Fig. 4, two feet in diameter and four inches broad, which supports the conveyer. Upon its shaft *i*, Plate 3, Fig. 4, which is two inches square, is placed a bevel-wheel, *j*, Plate 3, Fig. 4, twelve inches in diameter, thirty-six cogs driving a pinion, R, Plate 3, Fig. 4, of twelve cogs. Its shaft L L, Plate 3, Fig. 4, passes through the cone forward and backward to the left-hand side for its bearing at M, Plate 3, Fig. 4.

The cone is formed by a head or base, *b*, Plate 3, Fig. 4, made of one and a half-inch plank one foot six inches in diameter, and an apex, *s*, also of wood, placed two feet apart on the shaft L L, Plate 3, Fig. 4, with eight rods, *n*, Plate 3, Fig. 4, two feet six inches long, arranged at equal distances around the circumference, and extending beyond the base. The lower side of the cone is parallel to the frame-work below. The cone revolves backward and removes the butt end of the hemp, &c., to the left, after being dropped by the sustaining-rod *h*, Plate 1, which is withdrawn by the hand of an attendant whenever a bundle of convenient size has accumulated. A small roller, *p*, Plate 3, Fig. 4, twelve inches long and three in diameter, is placed vertically at the left-hand corner of the wedge, to prevent the hemp, &c., from being entangled and drawn forward by the machine.

The frame-work is of solid oak timber two inches thick, and joined as in the plates, which are on a scale of two inches to the foot, except Plate 4, which is one and a third inch to the foot.

It will be observed that the separator hereinbefore described, in its ordinary construction, is a part properly belonging to the cutting apparatus, and also that this separator has a peculiar construction, which adapts it to the purpose to which it is applied—as, for instance, its upper part, to be formed of the rod *d*, by being inclined gently rises considerably upward and backward, and gives the standing crop being cut a gentle lean from that left standing. It will also be observed that the sustaining-rod *h*, by being projected out parallel, or nearly so, with the arm or finger-bar, and at the proper height above and in rear of it, holds the top of the cut crop so high as to prevent the butts from sliding off the finger-bar, though but four inches wide; and, further, that the cut crop can be deposited in rear of the cutting apparatus in bunches by merely operating the sustaining-rod back and forth, which is a very simple operation, the simple and cheapest of any with which I am familiar; and still further, that the cut crop passes from the cutter heads foremost easier, and leaves the bunches in a much more perfect form, as is believed, for binding into sheaves, or removing without binding, than when removed in any other direction; but in many cases it is objectionable on account of being in the road of the team and machine when making a succeeding round. It will therefore be understood that when the automatic conveying apparatus (the revolving cone and wedge) is attached to the cutting apparatus the cut crop will, without the aid of the sustaining-rod, be removed, heads first, from the cutters to the side of the machine, out of the road of the team and machine when cutting a succeeding round; but this is also objectionable in most cases on account of leaving the cut crop lying in a continuous swath. Therefore, for retaining the advantages gained by the first of these two plans of removing the cut crop and overcome the defect in the latter way of removing it, it has been found necessary to use the sustaining-rod, as well as the revolving cone, conveyer, and wedge, which wedge, it will be seen, extends angling entirely across the platform, with a vertical roller attached to its rear end on its front side, revolving by the friction of the cut crop, thus delivering the gavel without entangling it. Thus arranged or combined, it will be seen that what is believed to be the best mode of removing the cut crop from the cutters is secured, and the cut crop deposited at the best possible place, being out of the road of the team and machine, which enables a field of grain to be cut down, when the bunches remain unbound, as removed by the machine.

It will be observed that the drawings hereinbefore referred to show the entire original invention, the other parts of which (not described in this division) are alluded to in divisions A and C, filed simultaneously with this division.

Having described the construction and operation of that portion of the invention made the subject of this application, what I claim as the invention of the said JOHN LOCKE HARDEMAN, deceased, is—

1. In combination with a cutting apparatus which projects out from one side of the main driving-wheel's frame, the sustaining-rod *h*, or its equivalent, arranged and operating substantially as hereinbefore described, for the purpose set forth.

2. In combination with a cutting apparatus which projects out from one side of the main driving-wheel's frame, the sustaining-rod *h*, wedge *a a a*, Plate 3, Fig. 4, and revolving cone, substantially as hereinbefore described, for discharging the cut grain in the manner specified.

WM. N. WHITELEY.

Witnesses:
SOL J. HOUCK,
REUBEN MILLER.